US008422867B2

(12) United States Patent
Waller

(10) Patent No.: US 8,422,867 B2
(45) Date of Patent: Apr. 16, 2013

(54) RECORDING APPARATUS

(75) Inventor: Arthur Simon Waller, Basingstroke (GB)

(73) Assignee: Sony United Kingdom Limited, Weybridge (GB)

( * ) Notice: Subject to any disclaimer, the term of this patent is extended or adjusted under 35 U.S.C. 154(b) by 1121 days.

(21) Appl. No.: 11/876,020

(22) Filed: Oct. 22, 2007

(65) Prior Publication Data

US 2008/0101760 A1     May 1, 2008

(30) Foreign Application Priority Data

Nov. 1, 2006   (GB) .................................. 0621775.6

(51) Int. Cl.
*H04N 5/76*     (2006.01)
(52) U.S. Cl.
USPC ........................................... 386/296; 386/291
(58) Field of Classification Search .................. None
See application file for complete search history.

(56) References Cited

U.S. PATENT DOCUMENTS

| 2004/0123318 | A1* | 6/2004 | Lee et al. ...................... 725/46 |
| 2006/0110132 | A1* | 5/2006 | Takakuwa et al. ............ 386/95 |
| 2006/0140219 | A1* | 6/2006 | Kawasaki et al. ........... 370/487 |
| 2006/0212904 | A1* | 9/2006 | Klarfeld et al. .............. 725/46 |
| 2006/0222325 | A1* | 10/2006 | Ellis ............................. 386/83 |

FOREIGN PATENT DOCUMENTS

| EP | 1 292 137 A1 | 3/2003 |
| JP | 2001-245264 | 9/2001 |
| JP | 2001-275072 | 10/2001 |
| JP | 2005-175523 A | 6/2005 |
| WO | WO 00/58833 A1 | 10/2000 |
| WO | WO 02/103940 A2 | 12/2002 |
| WO | WO 02/103940 A3 | 12/2002 |

OTHER PUBLICATIONS

Chinese Office Action issued Aug. 24, 2010, in Patent Application No. 200710199770.3 (with English-language translation).
European Search Report issued Jul. 11, 2011, in European Patent Application No. 07 25 4022.
Japanese Office Action Issued Aug. 7, 2012 in Patent Application No. 2007-284557 (with English translation).

* cited by examiner

*Primary Examiner* — William C Vaughn, Jr.
*Assistant Examiner* — Eileen Adams
(74) *Attorney, Agent, or Firm* — Oblon, Spivak, McClellend, Maier & Neustadt, L.L.P.

(57) ABSTRACT

A digital broadcast media recording apparatus has means for determining if a program which is scheduled to be broadcast has already been recorded, and, if it has been, for deciding if the program which is scheduled to be broadcast should be recorded based on a comparison of the attributes of the digital signal representing the scheduled program and corresponding attributes of the digital signal representing the recorded program. If it is determined that the scheduled program should be recorded, a control means gives an instruction which causes a recording unit to record the broadcast digital system representing the scheduled program when it is broadcast. Optionally, the digital signal representing the recorded program can be deleted once the digital signal representing the scheduled program is recorded. An identifier is used to determine whether the scheduled program is the same as a recorded program. This means that if the attributes of the digital signal representing the scheduled program are considered to be more desirable than the attributes of the digital signal representing the recorded program, the scheduled program can be stored on a storage media instead of, or as well as, the recorded version of the program.

34 Claims, 4 Drawing Sheets

RECORDING APPARATUS

BACKGROUND OF THE INVENTION (1) Field of the Invention

The present invention relates to a recording apparatus for recording broadcast digital signals representing programs.

(2) Description of Related Art

Conventionally, broadcast digital signals representing programs are recorded by a recording apparatus so that the programs which are represented by the digital signals can be watched at a time other than when the digital signal is broadcast. Programs may be referred to in other documents as events, and are what a user would conventionally refer to as a television program. For example, an episode of "Friends" would be one program, and an episode of "Top Gear" would be another program.

Many programs are now broadcast more than once, such that a program which has been recorded may be subsequently repeated at a different time and/or on a different television channel (a television channel in this sense being the same as what may be referred to in other documents as a service, e.g. BBC1 is one television channel and BBC2 is another television channel). Furthermore, the broadcast digital signal representing the repeated program may have one or more different attribute from the originally broadcast digital signal representing the program. For example, the first broadcasting of the program may have been in standard definition and a subsequent broadcast may be in high definition.

It may be that the user of the recording apparatus would prefer to watch the repeated version of the program, either as well as or instead of the originally broadcast version of the program, because of the different attributes. For example, in the above example, it may be that the user would prefer to watch a high definition version of the program, rather than the standard definition version of the program.

This requires the user to firstly look through the schedules of all of the available channels in order to see if a program is due to be repeated, and if it is, to check if any of the attributes of the digital signal representing the scheduled program are preferable to the same attributes of the digital signal representing the recorded program. If the user then decides to record the digital signal representing the scheduled program, it is necessary to either set the recording apparatus to record it, or to remember to record it when it is subsequently broadcast.

It may be that some or all of the information required to perform the above process is not directly available to the user. Furthermore, it is necessary for the user to repeat the process on a regular basis in order to check new programs as they appear in the scheduling window. This process is both time consuming and likely to result in errors due to the large quantity of data that needs to be manually processed by the user.

BRIEF SUMMARY OF THE INVENTION

The present invention provides a digital broadcast media recording apparatus comprising:
a recording unit capable of recording a broadcast digital signal representing programs; and
a control unit for controlling the recording unit,
the control unit being arranged to read signalling data which identifies: programs which are scheduled to be broadcast; and at least one attribute of the broadcast digital signal representing the programs,
the control unit being arranged to determine if a program which is scheduled to be broadcast has already been recorded, and, if it has been, for deciding if the program which is scheduled to be broadcast should be recorded based on a comparison of the attributes of the broadcast digital signal representing the program with the attributes of the recorded digital signal representing the program, and
the control unit being arranged to cause the recording unit to record the broadcast digital signal representing the program if it is decided that the program should be recorded.

The present invention as defined above provides the advantage that if a program which has already been recorded is scheduled to be repeated, it can be automatically recognised, and if one or more attributes or properties of the digital signal representing the repeated program is deemed to be better than the equivalent properties of the recorded version, the scheduled version can subsequently also be recorded when it is broadcast. The decision about whether or not to record the scheduled program can be based on a predetermined ranking of the attributes of the digital signal representing the recorded program and the scheduled program, such that there is no need for user interaction at the time of the decision.

In some embodiments, the control unit is arranged so as to compare an identifier of a program which is scheduled to be broadcast with an identifier of each of the programs which have been recorded in order to determine if the program which is scheduled to be broadcast has already been recorded.

This provides the advantage that both the recorded and scheduled programs can be easily identified using an identifier, so that it is straightforward to check if a scheduled program is the same as a program which has already been recorded.

In some embodiments, the broadcast digital signal is a digital television signal. The broadcast digital signal could be broadcast in any manner, eg a wireless terrestrial or satellite broadcast or over a cable. Similarly it could be broadcast over a network, for example being an IPTV signal. In another embodiment, the broadcast digital signal is a digital radio signal. This means that the invention can either be applied to television programs, or radio programs.

According to some embodiments associated with digital television signals, the signalling data is in accordance with the specifications of the TV-Anytime Forum, and the identifier is a Content Reference Identifier (CRID). This means that conventional signalling data, or meta-data, can be used with applications of the present invention associated with digital television in order to identify whether or not the digital signal representing a program which is scheduled to be broadcast has already been recorded.

To allow better understanding, an embodiment of the present invention will now be described by way of non-limitive example with reference to the accompanying drawings.

In the drawings:

DETAILED DESCRIPTION OF THE INVENTION

The following example is concerned with digital television signals.

The present invention uses signalling data in order to identify programs which are scheduled to be broadcast, and at least one attribute of the broadcast digital signal representing the programs. In the embodiment shown in FIGS. 1 and 2, the signalling data is in accordance with the DVB standard.

In DVB, the signalling data is arranged in packets, and each packet of signalling data is associated with a particular table, the arrangement and content of which is in accordance with those defined in EN 300 468. As defined in EN 300 468, each of the signalling data packets has a table identifier, which designates the table to which the packet belongs. Each signalling data packet also contains a "payload", which contains data about, inter alia, the audio and/or video attributes of the digital signals representing the programs.

The table identifier is used to locate an appropriate packet of signalling data which contains the required information, for example, information about which programs are scheduled to be broadcast, and information about the attributes of the broadcast digital signal representing the scheduled programs.

In the illustrated embodiment, signalling data is used to obtain a Content Reference Identifier (CRID), which is used to identify the scheduled programs and the recorded programs. CRIDs are used in signalling data which is in accordance with the specifications of the TV-Anytime Forum, and represent unique program content. Therefore, a repeated program would have the same CRID as the original program.

However, a digital signal representing a repeated program may have different attributes to the digital signal representing the original program, even though they have the same CRID. For example, the digital signal representing the repeated program might represent a higher video image resolution version of the program.

The digital signal attributes of the scheduled program (i.e. that which is being repeated) are obtained from the signalling data, and compared with corresponding digital signal attributes of the recorded program in order to determine whether or not the repeated program should be recorded.

Figure 1:
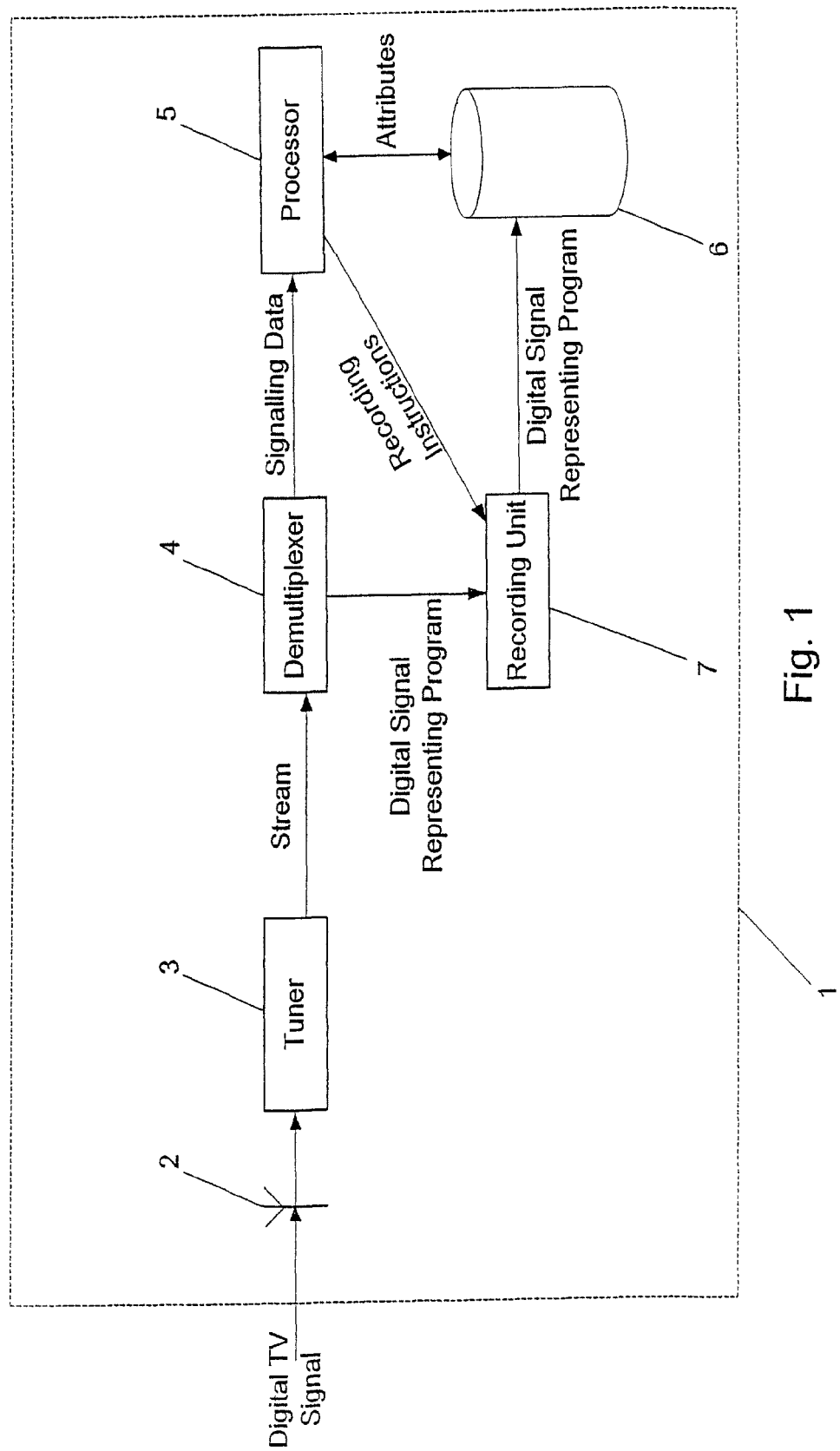
FIG. 1 is a schematic of a digital broadcast media recording apparatus according to an embodiment of the present invention.

FIG. 1 shows an arrangement of a recording apparatus 1 according to an embodiment of the present invention.

The recording apparatus 1 shown in FIG. 1 has a tuner 3, a demultiplexer 4, a processor 5, storage media 6, and a recording unit 7. The processor 5 acts as a control unit and controls the operation of the recording apparatus 1 and the recording unit 7 in particular. Alternative embodiments may not include one or more of the tuner 3, the demultiplexer 4 and the storage media 6. In still alternative embodiments, the recording unit 7 is not required, or is integral to the processor 5, such that instructions for recording are given directly from the processor 5 for the demultiplexer 4 to output the digital signal representing the scheduled program to the storage media 6.

Embodiments of the recording apparatus 1 could be, for example, a recording apparatus suitable for operation with a separate television unit, a combined television and recording unit, and a separate recording apparatus for use with an existing recording unit or combined television and recording unit.

The tuner 3 receives multiplexed digital television signals representing programs via an antenna 2, and outputs a stream of multiplexed data to the demultiplexer 4. The demultiplexer 4 demultiplexes the stream output from the tuner 3 into one or more video signals, one or more audio signals, and signalling data. A digital signal representing a program comprises an audio signal and an video signal output from the demultiplexer 4. The digital signal representing the program may be recorded by recording unit 7 onto storage media 6, depending on whether or not instructions are given to do so from processor 5. How the decision about whether or not the processor 5 gives instructions to record the digital signal representing the programs is arrived at is explained later in the description with reference to FIG. 2.

The audio and video signals may also be sent to a television screen, which is not shown in the figures.

The signalling data output from the demultiplexer 4 contains the information with which the processor 5 decides whether or not to record a digital signal representing a particular program. The signalling data that is used by the processor 5 contains information about programs which are scheduled to be broadcast, and attributes of the broadcast digital signal representing those programs. A decision is then made as to whether or not the digital signal representing the scheduled program should then be subsequently recorded. Therefore, the decision whether or not to record the digital signal representing a program which is output from the demultiplexer 4 will have been made based on signalling data output from the demultiplexer 4 into the processor 5 at an earlier time. The steps performed in order to determine whether or not to record a broadcast digital signal representing a scheduled program are explained in more detail later in the description with reference to FIG. 2.

The recording apparatus 1 shown in FIG. 1 is capable of recording a broadcast digital signal representing a program onto storage media 6. As well as recording the audio and visual signals of the program, information about the attributes of the broadcast digital signal representing the program is also recorded and stored on storage media 6. This enables the processor 5 to compare the attributes of the broadcast digital signal representing a program which is scheduled to be broadcast with the attributes of the digital signal representing the recorded program.

Storage media 6 can be any suitable data storage medium, for example, a hard drive that is integral to the apparatus, an external hard drive, a flash memory card, a flash memory stick, a CD, a DVD, or other optical or magneto-optical storage media. The recording apparatus 1 may also comprise apparatus required to record onto the storage media 6, for example a CD drive or a DVD drive.

When recording onto the storage media 6, the digital signal representing the program could be recorded directly onto the storage media 6. Alternatively, a process of encoding and decoding could be used. If the recording involves encoding and decoding, the user of the recording apparatus could have control over which encoding and decoding process is used. The type of encoding and decoding process can be chosen based on the desired quality (in terms of, for example, audio or visual quality) of the recording.

Figure 2:
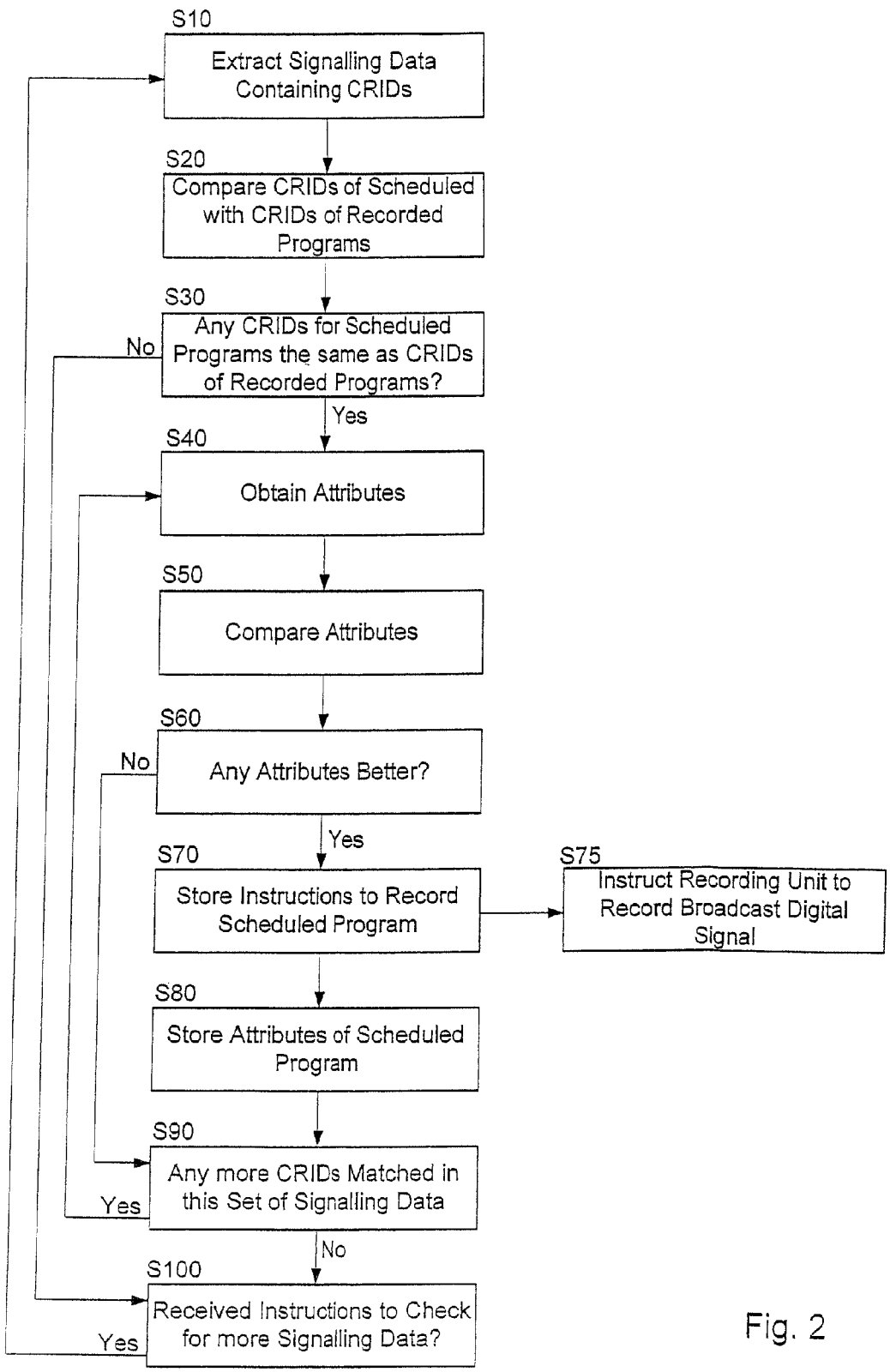
FIG. 2 is a flow chart showing the steps performed by the digital broadcast media recording apparatus according to an embodiment of the present invention.

FIG. 2 shows the steps performed by the recording apparatus shown in FIG. 1.

In step S10, the processor 5 receives packets of signalling data output from the demultiplexer 4. The processor 5 then uses the header information of the packets of signalling data which it receives in order to identify packets of data which contain content reference identifiers (CRIDs) of forthcoming, scheduled programs.

Any suitable packet of signalling data could be used in order to identify the CRIDs of scheduled programs. For example, the Program Location Table (PLT) could be used.

In order to identify the CRIDs of all of the scheduled programs, it may be necessary in step S10 to retune the tuner 3 in order to obtain more packets of signalling data. The tuner 3 may be retuned as many times as is necessary to obtain the signalling data required to identify CRIDs of all of the scheduled programs for which a CRID is available.

Once the CRIDs of all the scheduled programs for which a CRID is available have been obtained in step S10, in step S20 each of the CRIDs for the scheduled programs is compared, in turn, with the CRIDs of all of the recorded programs stored on the storage media 6. In step S30 it is determined whether or not any of the CRIDs of the scheduled programs are the same as any of the CRIDs of the recorded programs. This step establishes whether or not a further incidence (ie a repeat) of any of the recorded programs on the storage media 6 is scheduled to be recorded within the scheduling window covered by the signalling data obtained in step S10.

If it is determined that none of the CRIDs of the scheduled programs match any of the CRIDs of the recorded programs (S30: NO), i.e. none of the recorded programs are due to be repeated, then the process moves to step S100 to await instructions to check more signalling data for CRIDs of scheduled programs.

If the CRIDs of any of the scheduled programs are identified in step S30 as being the same as any of the CRIDs of the recorded programs (S30: YES), then a list is generated of the CRIDs which are shared by a scheduled program and a recorded program.

In step S40, the attributes of the broadcast digital signal representing the first scheduled program in the list which has the same CRID as a recorded program are obtained from signalling data. The signalling data used in step S40 could be from any suitable table which contains details of the attributes of the broadcast digital signal representing the scheduled program. For example, the signalling data could be a packet of signalling data belonging to the Program Information Table (PIT) or Program Map Table (PMT). Signalling data belonging to more than one table could be used in order to get information about all of the required attributes of the broadcast digital signal representing the scheduled program, with some attributes being obtained from one table, and other attributes being obtained from one or more other table(s).

In step S50, one or more attribute(s) of the broadcast digital signal representing the scheduled program is/are compared with attribute(s) of the digital signal representing the recorded program which has the same CRID as the scheduled program.

A number of different attributes of the two digital signals representing the program can be compared. For example, the attributes could be a video attribute of the broadcast digital signal, such as whether the program is in black and white or colour, what the video image resolution of the program is, what the format of the picture is (e.g. widescreen), whether subtitles are available for the program, and what coding has been used for the video signal. The video image resolution attribute could, for example, be whether the program is high definition (HD) or standard definition (SD). For different programs, different attributes could be compared.

The comparison can comprise a comparison of the value assigned to a particular attribute for the broadcast digital signal representing the program, and the value assigned to the particular attribute for the recorded digital signal representing the program (e.g. whether the program is HD or SD). Sometimes different incidences of the same program can have attributes of different identities. Thus, alternatively or additionally, the comparison can comprise a test of whether or not information about a particular attribute is available for each of the broadcast digital signal and the recorded digital signal.

Audio attributes of the digital signal representing the programs could also be compared. For example, the audio attribute could include whether the program has stereo audio or if it is multichannel audio (e.g. 5.1 or 7.1 audio), and if the audio is high definition (HD) or standard definition (SD).

It is also possible to compare attributes of the program itself, as well as or instead of the attributes of the digital signals representing the programs. The attributes of the programs could include, for example, whether or not the version of the program is cut or uncut, and whether or not the program is being shown as part of an omnibus edition. In the case of it being shown as part of an omnibus edition, instructions could also be given to record the rest of the programs in the omnibus edition.

The program attributes can be obtained from signalling data, stored, and compared in the same way as the attributes of the digital signals representing the programs herein described with reference to FIGS. 1 and 2.

In the illustrated embodiment, the user may identify which attributes of the two digital signals should be compared. Alternatively, a default list of attributes could be compared automatically.

In step S60, it is determined whether or not one or more of the attributes compared in step S50 is, by some measure, better for the scheduled program than for the recorded program.

Whether or not an attribute is determined as being better may be set by the user of the recording apparatus. In general, what constitutes an attribute being better is determined by the desire of the user. For example, if a program has been recorded in standard definition, and the attributes of the digital signal representing the scheduled program which has the same CRID as the recorded program show that the scheduled program is in high definition, and the user would prefer to have a high definition version of the program stored on the storage media 6, the recording apparatus 1 could automatically be set to record the digital signal representing the high definition version of the program.

Alternatively, it may be that the user is concerned with the size of the recorded file. This could be, for example, because of limited storage space, such as would be likely to be the case if the recorded program were intended to be used with a handheld, portable device such as a PlayStation Portable (PSP). In this instance, the user could automatically set the recording apparatus to record digital signals representing standard definition versions of programs which have already been recorded in high definition. The user may also be provided with the option of deleting the originally recorded version of the program from the storage media 6 once the scheduled, preferred, version of the program has been recorded. Alternatively, both versions of the program may be kept on storage media 6.

The criteria on which it is decided whether or not an attribute of the scheduled program is superior to an attribute of the recorded program is preset by the user of the recording apparatus. In other embodiments, the user may be prompted for an input to decide whether or not an attribute of the digital signal representing the scheduled program is better than an attribute of the digital signal representing the recorded program. The prompt could be, for example, an on-screen prompt, and the user could respond to the prompt by, for example, pressing a button on a remote control.

One or more than one attribute may be compared in step S50.

If it is decided in step S60 that none of the attributes of the digital signal representing the scheduled program is preferable to the corresponding attributes of the recorded version, the decision is made to not record the scheduled program, and the process goes to step S90, where it is determined whether or not there are any more programs in the list formed in step S30, which lists scheduled programs which have the same CRID as a recorded program.

If in step S60 it is decided that an attribute of the digital signal representing the scheduled program is preferable to a corresponding attribute of the digital signal representing the recording program (S60:YES), an instruction is stored in step S70 to record the digital signal representing the scheduled program when it is broadcast. The instruction to record the digital signal output from the demultiplexer 4 representing the program is subsequently sent to the recording unit 7 in step S75 at the time when the digital signal representing the program is broadcast. The recording unit 7 then records the broadcast digital signal representing the program onto the storage media 6.

In order to ensure that the instruction to record the digital signal representing the program is sent to the recording unit 7 at the correct time, the exact time of broadcast of the digital signal can be updated using suitable signalling data. The suitable signalling data may be output to the processor 5 from the demultiplexer 4 at any time from when the decision to record the digital signal is made, to when the digital signal is actually broadcast. The signalling data used to update the broadcast time can be from any suitable table, for example the Event Information Table (EIT).

In step S80, attributes of the digital signal representing the program, which were obtained from the signalling data in step S40, are sent from the processor 5 to the storage media 6, where they are stored. When the digital signal representing the program is subsequently recorded by the recording unit 7 (in response to the instructions given in step S75), it is stored on storage media 6 in a manner which enables it to be referenced by the attributes stored in step S80.

In alternative embodiments, the attributes of the digital signal representing the program are stored at the same time as the digital signal itself is recorded. This is achieved by sending signalling data, which is output from the demultiplexer 4 at the same time that the digital signal representing the program is output, to the recording unit 7, which extracts the attributes and stores them on the storage media 6.

In step S90, it is determined whether or not there are any more scheduled programs which have the same CRID as a program which has already been recorded, but for which the attributes of the digital signal representing them have not been compared with the digital signal representing the corresponding recorded program.

If it is determined in step S90 that there are more scheduled programs which have the same CRID as a recorded program, but for which the attributes of the digital signals representing the program have not yet been compared, the process returns to step S40, in which the attributes of the digital signal representing the scheduled program are obtained from the signalling data, as described above. The process then cycles through steps S40, S50, S60, S70, S75, S80 and S90, as required, until it is determined in step S90 that there are no more scheduled programs which have the same CRID as a recorded program, but for which the attributes of the digital signal representing them have not been compared with the attributes of the digital signal representing the recorded program. When this is determined (S90: NO) the process moves to S1100.

If all or part of the broadcast time of two or more of the digital signals representing programs for which an instruction has been given to record in step S70 are the same, the user may be prompted to decide which of the more than one broadcast digital signals representing the more than one programs should be recorded. Alternatively, it may be possible to record all of the broadcast digital signals representing the programs at the same time.

In step S100, the process waits for an instruction to read more signalling data in order to determine the CRIDs of the scheduled programs in the next scheduling window to be received, the scheduling window being determined by how far in advance the signalling data provides information about the scheduled programs.

The signalling data can be read (S100:YES), for example, at a regular interval, for example at a preset time of day, or upon request of the user of the recording apparatus.

The steps S10-100 in FIG. 2 are all performed by a computer program executed by the processor 5 shown in FIG. 1. The computer program may be stored on a computer-readable storage medium, such as a memory, or transmitted to the device over a network during which it is represented by a carrier wave.

In other embodiments, the procedure outlined in steps S10-S100 above may differ. Some non-limitative examples will now be described.

Firstly, the step of obtaining the attributes of the digital signal representing the scheduled program (step S40 above) may be performed at the same time that the CRIDs for the scheduled programs are obtained, i.e. in step S10.

Secondly, whilst the method described above refers to the programs which are already recorded, optionally it can additionally be performed with respect to programs which are due to be recorded, that is for which the recording apparatus is storing an instruction to record an incidence of the program scheduled to be broadcast in the future. In this case, step S20 additionally compares the CRIDs of programs which are scheduled to be broadcast with respect to the CRIDS of programs which are due to be recorded. Similarly, in step S30 it is determined on the basis of the CRIDs being the same whether, from amongst the programs which are scheduled to be broadcast, there is a further incidence of a program for which a different incidence is due to be recorded. The following steps S40 to S100 are performed as described above but with reference additionally to the programs which are due to be recorded.

By way of further example, rather than compiling a list of all of the programs for which a scheduled program has the same CRID as a recorded program in step S30, steps S40-S90 could be performed for the attributes of a digital signal representing a program which has the same CRID as a recorded program as soon as that scheduled program has been identified. In this alternative, once step S90 is completed, the CRID of the next scheduled program in the signalling data is obtained and compared with the CRIDs of all of the recorded programs until another match is found, at which point steps S40-S90 are repeated again. This alternative could be applied to the process shown in FIG. 2, or to the modified process described above in which the step of obtaining the attributes of the digital signal representing the scheduled program is performed at the same time that the CRIDs for the scheduled programs are obtained.

The recording apparatus 1 described above receives a terrestrial broadcast television signal at the antenna 2, but the recording apparatus 1 could equally be adapted to receive a television signal broadcast by any means including a wireless satellite broadcast, a broadcast over a cable or a broadcast over a network such as the internet, eg Internet Protocol Television (IPTV). In the case of IPTV, the broadcast digital signal could be any form of IPTV signal. For IPTV, CRIDS, or other equivalent program identifiers, are also used to identify programs and therefore, the apparatus and method described above could be implemented with IPTV. The signalling data may be, for example: contained in the IPTV signal as auxiliary data in the stream; contained in a separate stream; and/or obtained by a specific request to a source (for example, obtained upon a request from a recording apparatus to a server for the signalling data to be provided by the server).

According to one embodiment of the invention, it is possible to use the recording apparatus of the present invention with both digital TV and IPTV. For example, the recording apparatus can be used with, or include, an IPTV tuner, which receives signalling data from which program identifiers, or CRIDs, of the scheduled IPTV programs are extracted and then compared with the stored identifiers, or CRIDs, of the recorded programs, as in Steps S20 and S30 of FIG. 2. The recorded programs, and the attributes of the digital or IPTV signals representing them, may have been broadcast either on digital TV, or on IPTV.

Steps S40 to S100 shown in FIG. 2 are then repeated for the IPTV program and associated IPTV signal. Again, if any attributes of the IPTV signal representing the scheduled IPTV program are considered to be better than the equivalent attributes of the digital signal, or IPTV signal (depending on whether the recorded program was broadcast on digital television or IPTV) representing the recorded program with the same CRID, then instructions are given to record the scheduled program.

The apparatus can be capable of receiving signalling data from both digital television signals and IPTV signals, of giving instructions to record both digital signals representing programs and IPTV signals representing programs, and of storing and comparing attributes of the digital signal or IPTV signal representing recorded programs.

Any appropriate aspect or feature described above in relation to the embodiment relating to digital television could be applied to this embodiment relating to IPTV.

Figure 3:
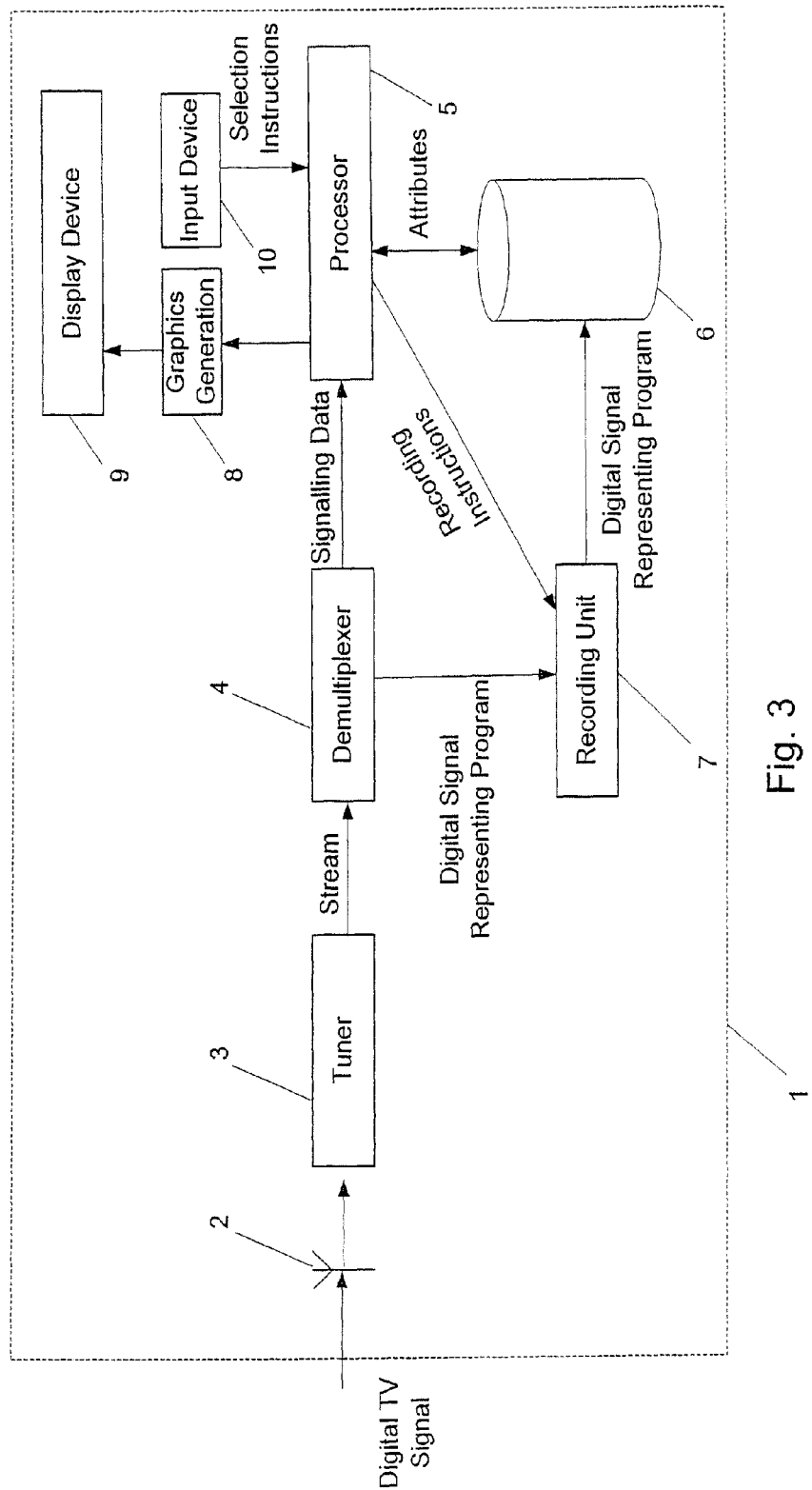
FIG. 3 is a schematic of a digital broadcast media recording apparatus for use with an electronic program guide application according to an embodiment of the present invention.

According to another aspect of the invention, there may be provided means for providing an electronic program guide (EPG). In the embodiment shown in FIG. 3, the EPG graphics are generated using suitable graphics generation device 8, and the EPG 14 is displayed to a user on a television screen 9. In FIG. 3, items with the same reference numerals as those shown in FIG. 1 have like functions, and so will not be described in detail.

Figure 4:
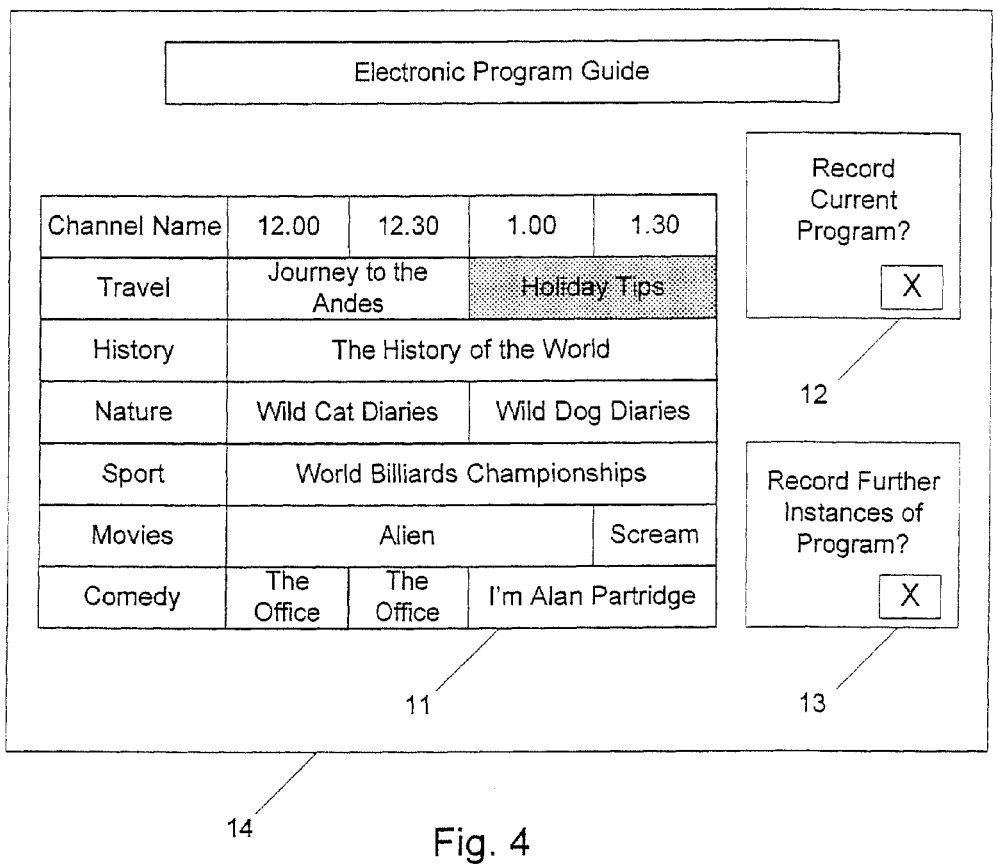
FIG. 4 is an example of an electronic program guide provided by an embodiment of the present invention.

An example of an EPG 14 which could be displayed with this embodiment of the invention is shown in FIG. 4. The EPG 14 is configured to display the scheduled programs to a user, as shown in listings box 11.

In the embodiment shown, the user can use a remote control device 10 to control the position of a cursor within the displayed EPG 14, and a button on the remote control device 10 to highlight a program. In FIG. 4, the highlighted program is called "holiday tips". The user is then able to select the highlighted program for recording by using a button on the remote control device 10 to check a recording selection box 12. A button on remote control device 10 can then be used to check a further instance recording box 13, and thereby set the apparatus to subsequently search future schedules for further instances of the program which has been selected for recording.

According to this embodiment, the user is able to select a program for recording in multiple formats, or to select the recording of multiple instances of the program, by making a setting at the time of recording one instance of the program. Responsive to the setting in box 13, the apparatus 1 is configured to search for further instances of the program up until the time that the selected program has been recorded, as well as after the time that it has been recorded, by performing the method described above in relation to FIG. 2.

Any suitable input device could be used in place of the remote control device 10 in order for the user to interact with the display device 9. For example, the input device could be a mouse, a remote control, a keypad, or a keyboard. Also, any suitable EPG screen format could be used to allow the user to highlight the program and to select the program for recording and for future instance recording.

In the embodiment illustrated in FIG. 3, the display device 9, through which a user can view the EPG 14, is shown as being part of the recording apparatus 1. In alternative embodiments, the display device 9 is separate from the recording apparatus, as would be the case, for example, if the display device 9 were a conventional television, and the recording apparatus 1 were a set-top box. The display device 9 could be any suitable display device such as, for example, a television screen, a monitor, or a display on a hand-held controller.

Any aspect or feature of the recording apparatus 1 described herein with reference to other embodiments is applicable to the embodiment which has means for providing an EPG.

According to another embodiment of the invention, the recording apparatus of the present invention can be used with digital radio, or digital audio broadcasting (DAB). In such an embodiment relating to digital radio, a digital radio tuner is used to receive digital radio signals representing programs, and signalling data. The signalling data contains information about the attributes of the digital radio signal representing the programs, as well as an identifier (analogous to a CRID), which identifies the program.

Once one or more scheduled program(s) has been identified as being the same as a recorded program, steps analogous to steps S40 to S100 shown in FIG. 2 are performed for the radio program and digital signal representing it.

Any appropriate aspect or feature described above in relation to the embodiment relating to digital television could be applied to this embodiment relating to digital radio.

According to different embodiments of the invention, the recording apparatus is capable of receiving and processing any combination of: digital television signals; digital radio signals; and IPTV signals.

The invention claimed is:

1. A digital broadcast media recording apparatus comprising:
   a recording unit capable of recording a broadcast digital signal representing programs; and a control unit arranged to control the recording unit,
   the control unit being arranged to read signaling data represented by a broadcast digital signal which comprises: identifiers that identify programs which are scheduled to be broadcast; and attribute data that identifies at least one attribute of the broadcast digital signal representing the programs which are scheduled to be broadcast,
   the control unit being arranged automatically and without user intervention to determine if a program which is scheduled to be broadcast has already been recorded based on an automated comparison of an identifier of the program which is scheduled to be broadcast with an identifier of each of the programs which have been rendered, and, if it has been, to automatically and without user intervention decide if the program which is scheduled to be broadcast should be recorded based on a comparison of the read attribute data that identifies attributes of the broadcast digital signal representing the program which is scheduled to be broadcast with the read attribute data that identifies attributes of the recorded digital signal representing the program, and the control unit being arranged automatically and without user intervention to cause the recording unit to record the broadcast digital signal representing the program which is scheduled to be broadcast if it is decided that the program which is scheduled to be broadcast should be recorded.

2. The apparatus of claim 1, wherein the broadcast digital signal is a digital television signal.

3. The apparatus of claim 2, further comprising a receiver/decoder for receiving and decoding a digital television signal, wherein the broadcast digital signal which is recorded by the recording unit is received and decoded by the receiver/decoder.

4. The apparatus of claim 3, wherein the signaling data is received and decoded by the receiver/decoder.

5. The apparatus of claim 1, wherein the attributes of the digital signal representing the programs include at least one video attribute of the broadcast digital signal.

6. The apparatus of claim 5, wherein the at least one video attribute is the video image resolution.

7. The apparatus of claim 1, wherein the signaling data is structured in tables which are in accordance with the Digital Video Broadcasting standard.

8. The apparatus of claim 7, wherein the control unit is arranged to extract the at least one attribute of the broadcast digital signal representing the programs from the Program Information Table (PIT).

9. The apparatus of claim 1, wherein the signaling data is in accordance with the specifications of the TV-Anytime Forum, and the identifier is a Content Reference Identifier (CRID).

10. The apparatus of claim 9, wherein the control unit is arranged to search the Program Location Table (PLT) in order to identify the Content Reference Identifiers of scheduled programs.

11. The apparatus of claim 9, wherein the control unit is arranged so as to search at a preset time of day for Content Reference Identifiers of scheduled programs.

12. The apparatus of claim 1, wherein the at least one attribute of the digital signal representing the programs includes at least one audio attribute of the broadcast digital signal.

13. The apparatus of claim 1, wherein the control unit is further arranged to cause said recorded digital signal representing the program to be deleted.

14. The apparatus of claim 1, wherein the control unit is further arranged to cause read attribute data that identifies one or more of the attributes of the said broadcast digital signal representing the program to be recorded.

15. The apparatus of claim 1, wherein the control unit is additionally arranged to:

determine if, from amongst the programs which are scheduled to be broadcast, there is a further incidence of a program for which program the apparatus has stored an instruction to record a different incidence based on a comparison of identifiers of the programs which are scheduled to be broadcast with an identifier of each program for which the apparatus has stored an instruction to record a different incidence; and decide, if it is determined that a further incidence exists, if the further incidence of the program should be recorded based on a comparison of the read attribute data that identifies attributes of the broadcast digital signal representing the further incidence of the program which is scheduled to be broadcast with the read attribute data that identifies attributes of the digital signal representing the different incidence of the program for which the apparatus has stored an instruction to record the different incidence.

16. The apparatus of claim 15, the control unit is further arranged to provide an electronic program guide, wherein the electronic program guide is configured to: display programs which are scheduled to be broadcast;

allow a user to choose an incidence of a program for recording from the schedule; and allow the user to make a setting in respect of said chosen program for recordal of further incidences.

17. The apparatus of claim 1, wherein the recording unit is capable of recording onto any one of: a hard drive that is integral to the apparatus; an external hard drive; a flash memory card; a flash memory stick; a CD; a DVD; or any other suitable data storage medium.

18. A method, performed by a digital broadcast media recording apparatus comprising a recording unit, of deciding whether or not to record a broadcast digital signal representing programs using the recording unit, the method comprising the following steps each performed by the digital broadcast media recording apparatus:

reading signaling data represented by a broadcast digital signal which comprises: identifiers that identify programs which are scheduled to be broadcast; and attribute data that identifies at least one attribute of the broadcast digital signal representing the programs;

automatically and without user intervention, determining if a program which is scheduled to be broadcast has already been recorded based on an automated comparison of an identifier of the program which is scheduled to be broadcast with an identifier of each of the programs which have been recorded, and, if it has been, automatically and without user intervention deciding if the program which is scheduled to be broadcast should be recorded based on a comparison of the attribute data read in the step of reading that identifies attributes, of the broadcast digital signal representing the program which is scheduled to be broadcast with the attribute data read in the step of reading that identifies attributes of the recorded digital signal representing the program; and automatically and without user intervention, controlling the recording unit to record the broadcast digital television signal representing the program which is scheduled to be broadcast if it has been decided that the program which is scheduled to be broadcast should be recorded.

19. The method of claim 18, wherein the broadcast digital signal is a digital television signal.

20. The method of claim 19, further comprising a step of receiving and decoding the broadcast digital television signal which is recorded by the recording unit.

21. The method of claim 20, comprising a step of receiving and decoding the signaling data.

22. The method of claim 18, wherein the attributes of the digital signal representing the programs include at least one video attribute of the broadcast digital signal.

23. The method of claim 22, wherein the at least one video attribute is the video image resolution.

24. The method of claim 18, wherein the signaling data is structured in tables which are in accordance with the Digital Video Broadcasting standard.

25. The method of claim 24, wherein the at least one attribute of the broadcast digital signal representing the scheduled programs is extracted from the Program Information Table (PIT) in the step of reading the signaling data.

26. The method of claim 18, wherein the signaling data is in accordance with the specifications of the TV-Anytime Forum, and the identifier is a Content Reference Identifier (CRID).

27. The method of claim 26, wherein the step of reading the signaling data comprises a search for Content Reference Identifiers of scheduled programs, the search being performed at a preset time interval.

28. The method of claim 26, wherein the Program Location Table (PLT) is searched in the step of reading the signaling data in order to identify the Content Reference Identifiers of scheduled programs.

29. The method of claim 18, wherein the at least one attribute of the digital signal representing the programs includes at least one audio attribute of the broadcast digital signal.

30. The method of claim 18, further comprising a step of deleting said digital signal representing the recorded program.

31. The method of claim 18, further comprising recording attribute data read in the step of reading that identifies one or more of the attributes of the broadcast digital signal representing the program.

32. The method of claim 18, wherein the step of determining additionally includes:
   determining if, from amongst the programs which are scheduled to be broadcast, there is a further incidence of a program for which program the apparatus has stored an instruction to record a different incidence based on a comparison of identifiers of the programs which are scheduled to be broadcast with an identifier of each program for which the apparatus has stored an instruction to record a different incidence; and
   deciding, if it is determined that a further incidence exists, if the further incidence of the program should be recorded based on a comparison of the attribute data read in the step of reading that identifies attributes of the broadcast digital signal representing the further incidence of the program which is scheduled to be broadcast with the attribute data read in the step of reading that identifies attributes of the digital signal representing the different incidence of the program for which the apparatus has stored an instruction to record the different incidence.

33. The method of claim 32, further comprising a step of providing an electronic program guide, wherein the electronic program guide is configured to:
   display programs which are scheduled to be broadcast;
   allow a user to choose a program for recording from the schedule; and
   allow the user to make a setting in respect of said chosen program for recordal of further incidences, said steps of determining and controlling being performed in response to the setting being made.

34. The method of claim 18, wherein the recording unit records onto any one of: a hard drive that is integral to the apparatus; an external hard drive; a flash memory card; a flash memory stick; a CD; a DVD; or any other suitable data storage medium.

* * * * *